United States Patent
Fox (10) Patent No.: US 6,862,521 B1
(45) Date of Patent: Mar. 1, 2005

(54) METHOD FOR INFERRING USEFUL INFORMATION FROM POSITION-RELATED VEHICULAR EVENTS

(75) Inventor: Lawrence J. Fox, Gilbert, AZ (US)

(73) Assignee: Trimble Navigation Limited, Sunnyvale, CA (US)

( * ) Notice: Subject to any disclaimer, the term of this patent is extended or adjusted under 35 U.S.C. 154(b) by 26 days.

(21) Appl. No.: 10/354,457

(22) Filed: Jan. 29, 2003

(51) Int. Cl.[7] .............................................. G01C 21/00
(52) U.S. Cl. ...................... 701/204; 701/209; 340/994
(58) Field of Search ................................ 701/209, 204, 701/210; 340/991, 994

(56) References Cited

U.S. PATENT DOCUMENTS

| | | | |
|---|---|---|---|
| 5,541,845 A | 7/1996 | Klein | 364/449 |
| 5,751,245 A | 5/1998 | Janky et al. | 342/357 |
| 5,987,377 A * | 11/1999 | Westerlage et al. | 701/204 |
| 6,694,248 B2 * | 2/2004 | Smith et al. | 701/117 |

* cited by examiner

Primary Examiner—Marthe Y. Marc-Coleman (57) ABSTRACT

A method for inferring useful information from position related vehicular events uses allows a vehicle to determine an arrival at a job site, without knowing the job site location in advance. Arrival information can be reported or downloaded later. The method predicts arrival using a series of implied rules. The rules are based on trigger events detected by a sensor and microprocessor installed in the vehicle monitors for the occurrence of a trigger event that indicates that work is about to commence. Such trigger events can also be unique vehicular activities indicative of work commencement.

34 Claims, 6 Drawing Sheets

METHOD FOR INFERRING USEFUL INFORMATION FROM POSITION-RELATED VEHICULAR EVENTS

FIELD OF THE INVENTION

Embodiments of the present invention relate to the field of transportation management. Specifically, embodiments of the present invention relate to a method for inferring useful information from position related vehicular events.

BACKGROUND OF THE INVENTION

The dispatching of vehicles is an important function within a modern transportation management. The dispatching function typically sends vehicles from one location to another assigned location. The first location is a point of origin location. The other assigned location is a destination. In the dispatch environment, the original location (e.g., point of origin) is typically a known location, such as of a base of operations. Destinations are typically sites at which the vehicle is expected to engage in some activity.

Numerous commercial and industrial functions can characterize such activity. For instance, the vehicle can be a truck, dispatched from a base of operations yard at which it is loaded with a cargo, to a destination such as a work site, at which the cargo will be unloaded. Thus, a destination of a dispatched vehicle typically represents a job site (e.g., a location at which some work is occurring) at which the vehicle will execute a function characteristic of the purpose (e.g., mission) for which it was dispatched.

The base of operations of a dispatched vehicle sometimes represents a location such as a facility at which the vehicle is readied for its mission. However, the original location of a vehicle with respect to a particular destination can also be a current location of a particular vehicle, which can differ from its base of operations. For example, a vehicle that has previously been dispatched to its current location can be dispatched again from that current location to a subsequent destination.

Modern dispatching operations for sending a fleet vehicle to a job site can be facilitated by a computer running a dispatching oriented software application (e.g., a dispatching package). Information about the geographic location (e.g., locational information), such as geographic coordinates of a job site can be useful to the functionality of such dispatch packages. Some dispatching packages however lack the ability to supply or send geographical coordinates of a work site to a vehicle being dispatched.

Further, while some dispatching packages do have some geo-locational information promulgating capability, they may have difficulty resolving locational information such as similar addresses. For example, in attempting to inform a vehicle being dispatched of its destination, such a dispatching application may confuse addresses such as "123 Main Street" and "123 Main Road," or the addresses "5678 South Highway 9" and "5678 S. Heigh Way No. 9." Another problem confronting such dispatching practices is that, when the job site to which a vehicle is to be dispatched is a construction site, addresses, even roads themselves, may not yet exist. Address promulgation in this case is useless.

In some instances, a road itself may constitute the construction project. In the case of road construction, even promulgating a fixed geographical position of the job site to a vehicle being dispatched can be extraordinarily difficult. For instance, if a cement mixer and/or an aggregate-carrying dump truck is/are being dispatched to deliver concrete/aggregate for a road being built, the actual job site for these vehicles is the site at which their loads are delivered and dispensed from the vehicles into the roadbed under construction.

Typically however, such vehicles can be among a plurality of other such vehicles similarly loaded. Thus, before arrival at their job site, these vehicles may have to queue up with a number of others, all waiting to dispense their loads. How long they stand in queue before they arrive at their actual job site can depend, among other things, on the speed and efficiency of the job site road crew. The cement mixer's concrete load is perishable however, with fixed times of mixing, typically measured in drum turns at a given drum speed and direction, as delineated in engineering specifications for a particular job or conditions and enforced by on-site inspectors. Economic loss is sustained if the load perishes.

Some dispatching packages may use locational information supplied from a dispatched vehicle to attempt to determine the arrival of a dispatched vehicle at a job site or into a region proximate to the job site. For instance, a dispatched vehicle can deploy position determination receiver device for reception of signals from the Global PositioningSystem (GPS, e.g., a collection of satellites, launched and managed by the U.S. Air Force, for broadcast distribution of radio signals containing information from which position on earth can be determined), hereinafter referred to as a GPS device, or "GPS." The GPS can determine the geographic position of the vehicle, such that the driver or other vehicle operator can "know" or have locational information available upon the vehicle's arrival at or departure from a job site or a region proximate to it. In response to obtaining this locational information, the GPS can wirelessly notify (e.g., pass the locational information to) a dispatch application.

However, if the dispatched vehicle cannot be informed of locational information such as the geographic position of the job site beforehand, the GPS lacks the ability to signal or alert the dispatch application of arrival at or proximity of the dispatched vehicle to the job site. The conventional solution to this shortcoming is for the driver or another operator to have to first realize that the dispatched vehicle has arrived at or is proximate to the job site, and then second, to take some positive action to notify or signal the dispatch application of that fact.

This conventional solution can be problematic, because the vehicle operator may not readily recognize the precise arrival or coming into proximity, especially for instance if the operator is unfamiliar with the area. The conventional solution can also be problematic because a vehicle operator can fail to timely take the positive notification or signaling action. In the case of a vehicle waiting in queue prior to arrival at the job site, the operator may lack sufficient information to correctly apprise the dispatch application of the vehicle's arrival. Thus the dispatch application may not be notified of the correct job site arrival/departure time, or worse, may not be notified of the arrival/departure at all.

For a vehicle waiting in queue with a perishable load, arrival notification can be crucial to avert economic loss associated with the load perishing, and/or to shift responsibility for the economic loss to a responsible party. For example, if the concrete load of a cement mixer perishes while the vehicle waits, delayed in queue prior to arrival at the vehicle's particular job site, and the delay in queue is the fault of a contractor's inefficient road crew, the dispatch application without notification of arrival lacks a way to "captures the contractor's true responsibility for the economic loss.

Thus, the conventional art can be problematic because not all dispatching applications can promulgate adequate locational information to a vehicle being dispatched. Dispatching applications which do have such capability may have difficulty resolving locational information such as addresses, and where addresses do not exist, retain the inability to convey some locational information. Where roads are themselves under construction, a precise arrival at or in proximity to a job site can be difficult to ascertain. Further, if geographic coordinates of a job site are not supplied before a vehicle is dispatched, even sophisticated conventional solutions such as GPS can be inadequate to ascertain job site arrival.

Conventional solutions can also be problematic because they may rely on operator action to notify a dispatch application of arrival, yet the operator may fail to realize that arrival has occurred and/or may fail to take the appropriate action. A dispatch application may thus not be informed of arrival/departure of a dispatched vehicle. Where a dispatch application is not informed of arrival/departure of a dispatched vehicle, unrecoverable economic loss may occur.

SUMMARY OF THE INVENTION

What is needed is a method and/or a system that can ascertain arrival/departure of a dispatched vehicle at or proximate to a job site that does not rely on prior promulgation of locational information relating to the job site. What is also needed is a method and/or a system that can ascertain arrival/departure of a dispatched vehicle at or proximate to a job site that does not rely on an operator taking action to inform a dispatch application. Further, what is needed is a method and/or a system that can ascertain arrival/departure of a dispatched vehicle at or proximate to a job site and that can allow accounting for time in a job site related queue prior to reaching the proximity of the job site.

In one embodiment, a method and system herein that infer useful information from position related vehicular events ascertain arrival/departure of a dispatched vehicle at or proximate to a job site without reliance on prior promulgation of locational information relating to the job site. In one embodiment, a method and system herein ascertain arrival/departure of a dispatched vehicle at or proximate to a job site without reliance on operator action to inform a dispatching application thereof. In one embodiment, a method and system herein ascertain arrival/departure of a dispatched vehicle at or proximate to a job site and allows accounting for time in queue prior to reaching a job site proximity.

In one embodiment, the operation of a mechanism or a similar event allows a vehicle equipped with a geographical position reckoning system to determine an arrival and/or departure of the vehicle from a job site, without knowing the location of the job site in advance. The vehicle can then report its arrival/departure from the job site to a dispatcher and/or to a dispatch application by various media, such as wireless transmission and/or downloading data from a data store upon the vehicle's return to a dispatching site.

In one embodiment, a method of predicting the arrival/departure of a dispatched vehicle at/from a site using a series of implied rules. The rules are based on one or more trigger events, e.g., specific activities corresponding to the commencement of work, using a series of implied rules. A system comprising a microprocessor or microcontroller device installed in or deployed by a dispatched vehicle monitors for the occurrence of an event or sequence of events that indicate in some positive sense that work is about to commence. Such trigger events can also be unique vehicular activities indicative of work commencement.

Advantageously, an embodiment of the present invention allows a vehicle to be dispatched to a job site without knowing beforehand the geographical location of the job site. The present embodiment also advantageously allows arrival to be ascertained by events undergone by the dispatched vehicle, without any positive operator action. Further, the present embodiment allows the first vehicle dispatched to such a job site to infer the location of the job site by such vehicular events, such that subsequently-dispatched vehicles can "know" the job site location upon being dispatched.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF AN EMBODIMENT OF THE INVENTION

A method and system for inferring useful information from position related vehicular events, is disclosed. Reference will now be made in detail to embodiments of the invention, examples of which are illustrated in the accompanying drawing figures.

Notation and Nomenclature

While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the embodiments of the present invention, numerous specific details are set forth in order to provide a thorough understanding of the present invention. However, one of ordinary skill in the art will realize that embodiments of the present invention may be practiced without these specific details. In other instances, well-known methods, procedures, networks, systems, components, devices, and circuits have not been described in detail so as not to unnecessarily obscure aspects of the present invention.

Figure 4:
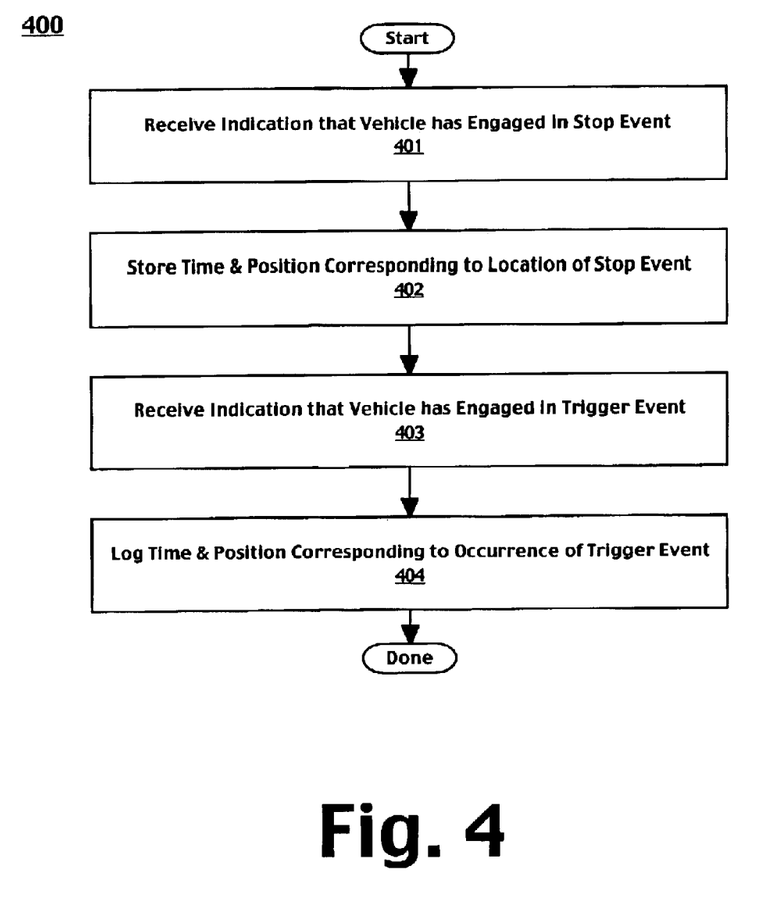
FIG. 4 is a flowchart of the steps in a method for inferring useful information from position related vehicular events, according to one embodiment of the present invention.

One embodiment of the present invention deploys a system for inferring useful information from position related vehicular events. The system can comprise modules that can be implemented in software, firmware, and/or hardware or any combination of software, firmware, and/or hardware. Portions of the detailed descriptions of embodiments of the invention that follow are presented in terms of processes (e.g., Process 400; FIG. 4). Although specific steps are disclosed in figures herein describing the operations of these processes, such steps are exemplary. That is, embodiments of the present invention are well suited to performing various other steps or variations of the steps recited in the flowcharts herein.

In one embodiment, such processes are carried out by processors and electrical/electronic components under the control of computer readable and computer executable instructions. The computer readable and computer executable instructions reside, for example, in data storage features, memory, registers and other components of a microprocessor or microcontroller based system, or in any type of computer readable medium.

An embodiment of the present invention effectuates the inference of useful information from position related vehicular events. Advantageously, an embodiment of the present invention allows a vehicle to be dispatched to a job site without knowing beforehand the geographical location of the job site. The present embodiment also advantageously allows arrival to be ascertained by events undergone by the dispatched vehicle, without any positive operator action. Further, the present embodiment allows the first vehicle dispatched to such a job site to infer the location of the job site by such vehicular events, such that subsequently dispatched vehicles can "know" the job site location upon being dispatched.

Exemplary Dispatch Environment

Figure 1:
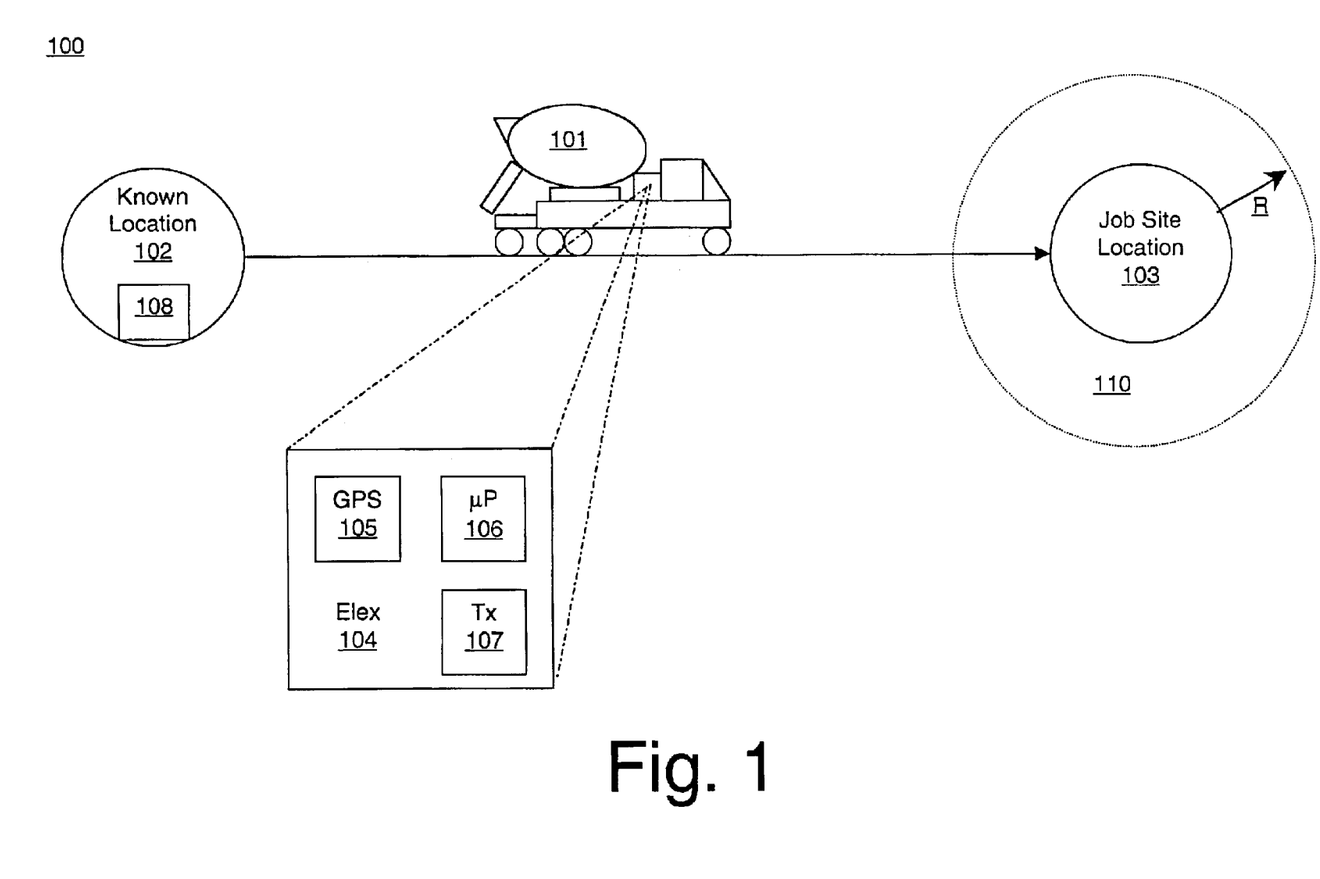
FIG. 1 depicts a high level modular overview of a dispatch environment incorporating an embodiment of the present invention.

With reference to FIG. 1, an exemplary dispatch environment 100 is depicted in which an embodiment of the present invention can be used advantageously. A vehicle 101 is dispatched from a known location 102 to a job site location 103. Job site location 103 is encompassed within a vicinity 110. Vicinity 110 characterizes a region proximate to job site location 103 out to a distance R. Vehicle 101 is equipped with an electronics platform 104. Electronics platform 104 can deploy a system for inferring useful information from position related events of vehicle 101.

Vicinity 110 represents an area proximate to job site 103 wherein, for dispatched vehicle 101 to stop within it, the time the vehicle stopped and the position within vicinity 110 are deemed close enough to job site 103 to infer that vehicle 103 has arrived at job site 103, or that its arrival at job site 103 is imminent. The time and position of a stop of vehicle 101 within vicinity 110 is thus 'in tolerance'. The tolerance for stop position and time are values that are specific to different activities (e.g., businesses, enterprises, technologies, etc.). The tolerance is represented by a time window and a maximum deviation in position. In the present embodiment, the maximum deviation in position from the precise location of job site 103 is the value of 'R'.

A dispatching function 108 is based at known location 102. Dispatching function 108 dispatches (e.g., sends) vehicle 101 from the known location 102 to the job site location 103, which is the destination at which the vehicle 101 is expected to engage in some activity. Known location 102 can be an point of origin, such as of a base of operations at which vehicle 101 is readied for its mission (e.g., the purpose for which the vehicle 101 is dispatched). Known location 102 can also be an intermediate location, such as a current location of a particular vehicle, different from its base of operations, to which vehicle 101 has previously been dispatched, and from which vehicle 101 can be dispatched again to the ultimate destination, which is job site 103.

The activities vehicle 101 is expected to engage in once it reaches job site location 103 are vehicular events that can be inferred to indicate that the vehicle 101 has arrived at the job site 103. Numerous commercial and industrial functions can characterize such activity, depending upon the mission of vehicle 101. Vehicle 101 can be a truck, for instance, dispatched from a base of operations yard characterizing known location 102 at which it was loaded with a cargo, and dispatched to a destination such as job site 103, where the cargo is to be unloaded. Events that correspond to arrival at destination job site 103 can be characterized by activities associated with delivery of the cargo.

In one embodiment, a method of predicting the arrival/departure of a dispatched vehicle at/from a site uses a series of implied rules. The rules are based on one or more of these events, e.g., specific activities corresponding to the commencement of work. Trigger events are activities unique to vehicle 101, which are indicative of work commencement by vehicle 101. Such events can include, for instance, a delivery, accessing tools and/or equipment, preparation for dispensing of a cargo material, operating certain controls or mechanisms, or the like, occurring using a series of implied rules. For example, a cargo access door opens in a delivery truck, the bed raises in a dump truck, the drum of a cement mixer spins at 7 RPM in the reverse direction, a tool bin cover lifts in a service truck, etc.

Where operator action is associated with the activity, such as engaging a lever or positioning a switch or opening a door or cover, the action does not have to be one in which the operator is taking a conscious action to report arrival at job site 103. Rather, the action is one that is associated with the work being performed at job site 103. The operator action is thus inferentially associated with "being at" (e.g., having arrived at) the job site 103. The event or activity thus allows an inference to be drawn that the vehicle 101 has arrived at or proximate to the job site 103. The event or activity that allows the inference that work is commencing is a trigger event.

The trigger event may take place within vicinity 110 surrounding job site 103. In this event, the trigger event implies arrival within vicinity 110, e.g., a region proximate to job site 103. Advantageously, this allows application of the implied rules to establish arrival even in the event that job site 103 is dynamically uncertain. For example, where vehicle 101 is to deliver or dispense cargo material for the construction of a road, job site 103 is the location at which vehicle 101 actually delivers/dispenses the material.

However, prior to reaching that job site 103, vehicle 101 may stand in a queue of similarly loaded vehicles, awaiting its turn to deliver/dispense its cargo. During some or all of time in queue, vehicle 101 may be within vicinity 110 and perform or engage in the trigger event therein. From such a trigger event occurring within vicinity 110, it may be inferred that vehicle 101 has arrived at a location proximate to job site 103.

Vehicle 101 is equipped with an electronics package 104. Electronics package 104 comprises a geographical position reckoning system (GPS) 105, a microprocessor or microcontroller device 106, and a reporting functionality 107, which in one embodiment is a wireless transmitter. Vehicle 101 is also equipped with a device 110 that monitors the occurrence of a trigger event. Microprocessor device 106 can receive input from trigger event monitoring device 110.

The geographical position reckoning system (GPS) 105 with which vehicle 101 is equipped allows the geographic position of vehicle 101 to be determined with considerable precision, for instance, at the place at which the trigger event occurs. GPS 105 can be a GPS such as a Placer™ GPS 450/455 device, commercially available from Trimble, Inc., a corporation in Sunnyvale, Calif. By determining the geographic position at which a trigger event occurs, GPS 105 allows an arrival and/or departure of the vehicle from job site 103 to be determined, despite the fact that the location of the job site 103 was not known in advance.

Vehicle 101 can report its arrival/departure from job site 103 via a reporting functionality 107. The report can be made to a dispatcher and/or to a dispatch application by a number of media. In one embodiment, reporting functionality 107 initiates wireless transmission of arrival/departure. Reporting can also be done by downloading data from a data store upon the vehicle's return to dispatching site 108. Dispatch site 108 can be the site from which the vehicle was dispatched, or any other site or network having downloading capability.

Exemplary System and Network

Figure 2:
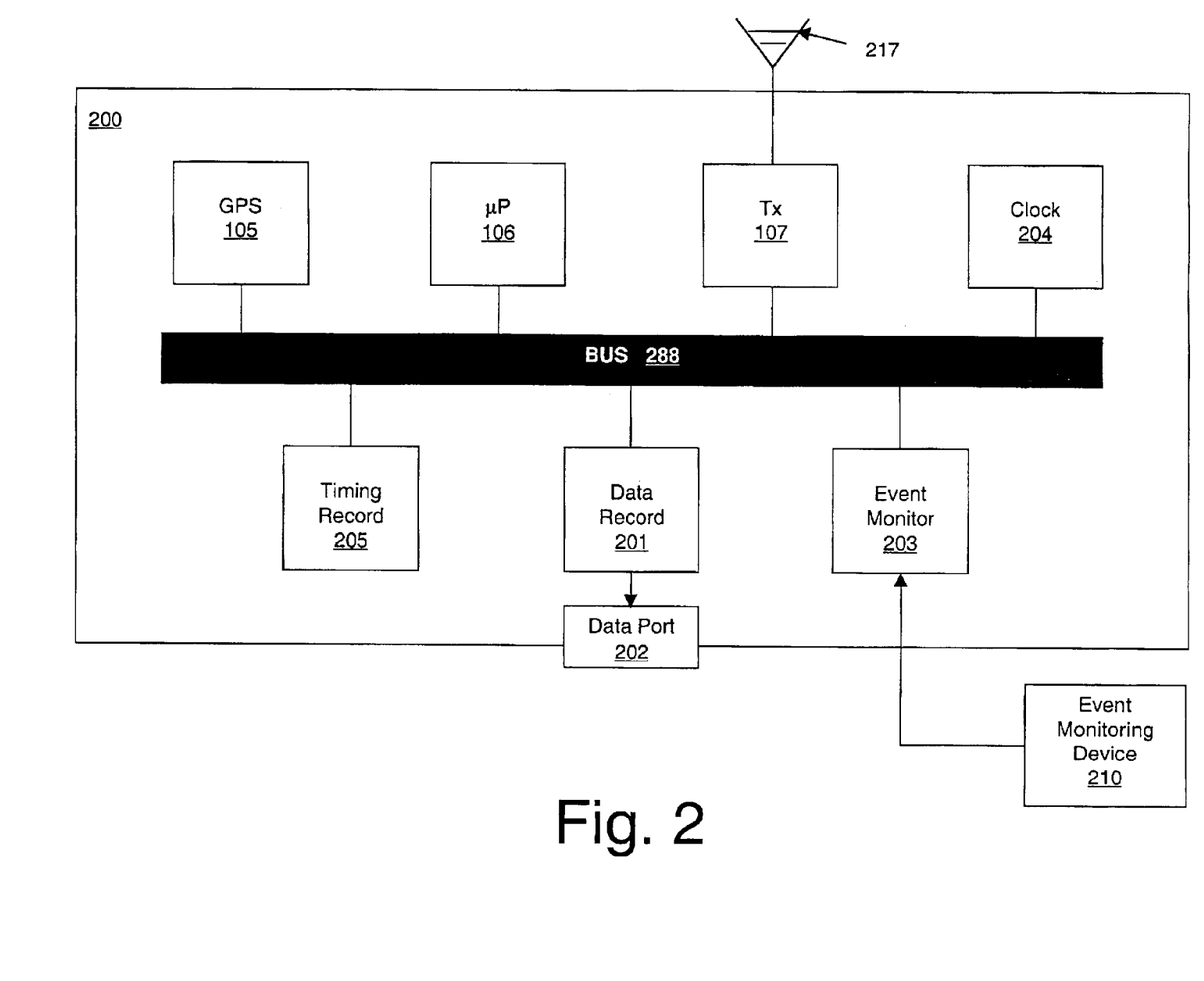
FIG. 2 is a block diagram of an exemplary system for inferring useful information from position related vehicular events, according to one embodiment of the present invention.

FIG. 2 depicts a system 200 according to one embodiment of the present invention. System 200 is installed in or deployed on a dispatched vehicle (e.g., vehicle 101; FIG. 1). So installed/deployed, system 200 derives the inference of useful information from position related vehicular events, such as arrival at or proximate to a job site (e.g., job site 103; FIG. 1). Advantageously, the present embodiment allows this information to be inferred without the job site location being known in advance.

System 200 can be installed on the vehicle as a part of an electronics or instrumentation package (e.g., electronics package 104; FIG. 1). System 200 is comprised of a number of functionalities such as modules and/or components, which can be hardware, firmware, software, or any combination of hardware, firmware, and software. These functionalities are interconnected in system 200 by a bus 288. A microprocessor or microcontroller 106 executes pre-programmed instructions to process information and effectively operationally control system 200. In one embodiment, system 200 contains and operates Site Dispatch™ logic and Ready-Mix logic, commercially available from Trimble, Inc., or similarly capable logic.

Event monitoring device 210 monitors for trigger events and sends corresponding data to an event monitor 203. Event monitor 203 receives inputs from event monitoring device 210. Monitored events are stored in event-timing-position (ETP) recorder 205. A clock 204 time stamps or otherwise correlates the time with the occurrence of trigger events, which are stored in ETP record 205.

GPS 105, which can be a GPS receiver, allows the geographic position of the vehicle to be precisely and accurately determined. By determining the geographic position at which a trigger event occurs, GPS 105 allows an arrival and/or departure of the vehicle from job site 103 to be determined, despite the fact that the location of the job site 103 was not known in advance. The position at which a trigger event is stored in ETP record 205.

The time of occurrence and position of occurrence are then correlated with the respective trigger event. In one embodiment, this correlation can be performed autonomously (e.g., with respect to the rest of system 200) in ETP record 205. In another embodiment, the correlation can be performed in the microprocessor device 106. In yet another embodiment, the correlation can be performed in ETP record 205 under control of microprocessor device 106.

Figure 3:
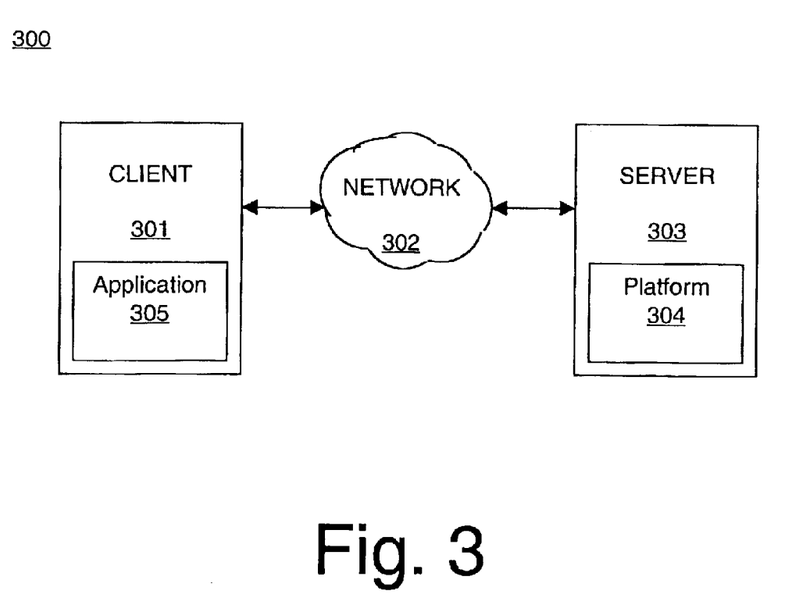
FIG. 3 is a block diagram of an exemplary client-server system, according to one embodiment of the present invention.

Once correlated, the time and position event information are stored in a data record 201. These data are extractable from data record 201, and can be transmitted, for instance via a wireless interconnection effectuated by transmitter 107 and antenna 217 and/or downloaded via a data port 202. In one embodiment, GPS 105 sends position information that is correlated by an external functionality with the time stamped trigger event occurrences. In one embodiment, these data provide sufficient information for an external application (e.g., platform 304; FIG. 3).

With reference to FIG. 3, transmission of trigger event and correlated position and time information is effectuated by a client server network 300. In one embodiment, client computer 301 is interconnected via network 302 with server 303. Trigger event and correlated position and time data is wirelessly transmitted from a dispatched vehicle (e.g., vehicle 101; FIG. 1) to data receiving server 303. Server 303 deploys, in one embodiment, a Televisant™ platform 304, which is commercially available from Trimble, Inc., or a similarly capable application. Client 301 comprises an application 305 that receives, accepts, and processes all data from the Televisant™ or similar platform.

Exemplary Processes

Exemplary Process of Inferring Useful Information

In a dispatch environment having a dispatch site, a vehicle, and a job site, an exemplary process (e.g., method) 400, executed according to one embodiment of the present invention allows the inference of useful information, such as determining arrival of the vehicle at the job site.

With reference to FIG. 4, process 400 begins with step 401, wherein an indication is received that the vehicle engaged in a stop event (e.g., an event wherein the vehicle stops).

In step 402, the time and a position corresponding to a location of the stop event is stored, for instance in a record of events and corresponding times and positions (e.g., ETP record 205; FIG. 2).

In step 403, an indication is received that the vehicle has engaged in a trigger event, for instance, by receiving a signal by an event monitor (e.g., event monitoring device 210; FIG. 2).

In step 404, in response to receiving an indication that the vehicle has engaged in a trigger event, the corresponding time and position is logged with the occurrence of that event. Upon execution of step 404, process 400 is complete.

Exemplary Process of Inferring a Location of a Job site

Figure 5:
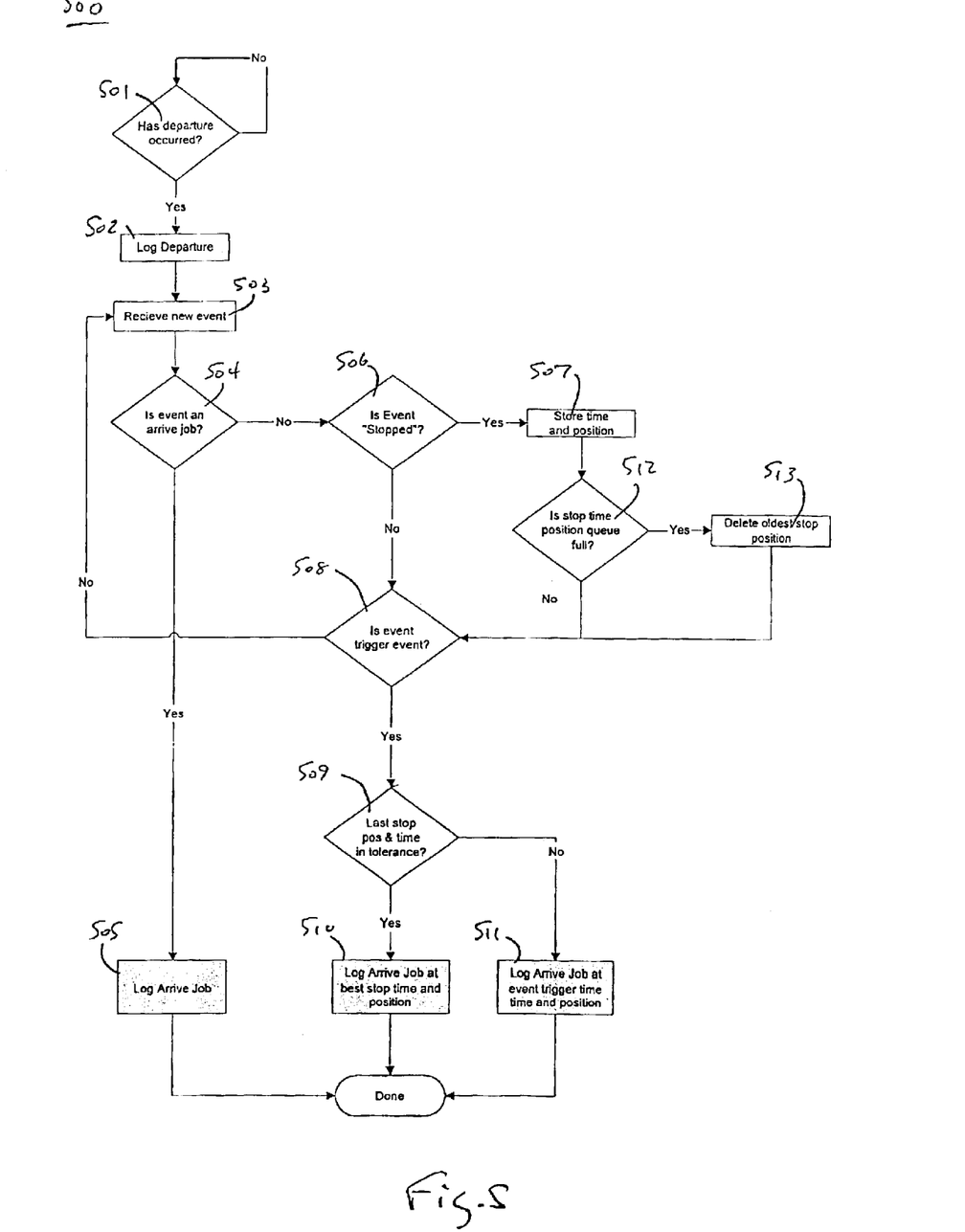
FIG. 5 is a flowchart of the steps in a method for inferring useful information from position related events incurred by an exemplary vehicle, according to one embodiment of the present invention.

With reference to FIG. 5, a process 500 infers the location of a job site from information provided by a dispatched vehicle. Process 500 begins with step 501, wherein it is determined whether the vehicle has departed from where it was dispatched.

If it is determined that the vehicle has departed from where it was dispatched, then in step 502, this departure is logged. If it is determined that the vehicle has not departed from where it was dispatched, then process 500 loops back to repeat step 501 until it is determined that the vehicle has departed.

In step 503, notification is received that the vehicle has engaged in a new event, such as by receiving a signal by an event monitoring device (e.g., monitor 210; FIG. 2).

In step 504, it is determined whether the new event comprises an arrival at a job site.

If it is determined that the vehicle has arrived at the job site, then in step 505, the arrival of the vehicle at the job site is logged.

If it is determined that the vehicle has not arrived, then in step 506, it is determined whether the event is a 'stop' event, e.g., an event denoting that the vehicle has stopped.

If it is determined that the event is a 'stop' event, then in step 507, the time and position corresponding to the 'stop' event is stored, for example, in a stop time position queue (e.g., ETP record 205; FIG. 2).

If it is determined that the event is not a 'stop' event, then in step 508, it is determined whether the event is a 'trigger' event.

If it is determined that the event is a 'trigger' event, then in step 509, it is determined whether the last stop position and time are in tolerance.

The tolerance for stop position and time are values that are specific to different activities (e.g., businesses, enterprises, technologies, etc.). The tolerance is represented by a time window and a maximum deviation of position, for example, within a vicinity (e.g., vicinity 110; FIG. 1) proximate to a job site (e.g., job site 103; FIG. 1). For a particular activity wherein, for a dispatched vehicle (e.g., vehicle 101; FIG. 1) to stop within it the vicinity, the time the vehicle stopped and the position within the vicinity are deemed close enough to the job site to infer that the vehicle has arrived at the job site, or that its arrival there is imminent. Thus, the time and position of that stop are deemed to be 'in tolerance'. The tolerance for stop position and time are values that are specific to different activities (e.g., businesses, enterprises, technologies, etc.). Tolerance is thus represented by a time window and a maximum deviation in position.

If it is determined that the last stop position and time are in tolerance, then in step 510 'arrive job' is logged at the best stop time and position.

If it is determined that the last stop position and time were not in tolerance, then in step 511, 'arrive job' is logged at the time and position of the trigger event.

Upon storing the time and position of a 'stop' event (e.g., step 507), then in step 512, it is determined whether the stop time position queue is full.

If it is determined that the stop time position queue is full, then process 500 proceeds to step 509.

If it determined that the stop time position queue is full, then in step 513 the oldest stop position is deleted (e.g., cleared) from the stop time position queue, and process 500 proceeds to step 509 at this point.

Upon execution of step 505, step 510, or step 511, process 500 is complete.

Exemplary Process for a Dispatched Material Dispensing Vehicle

Figure 6:
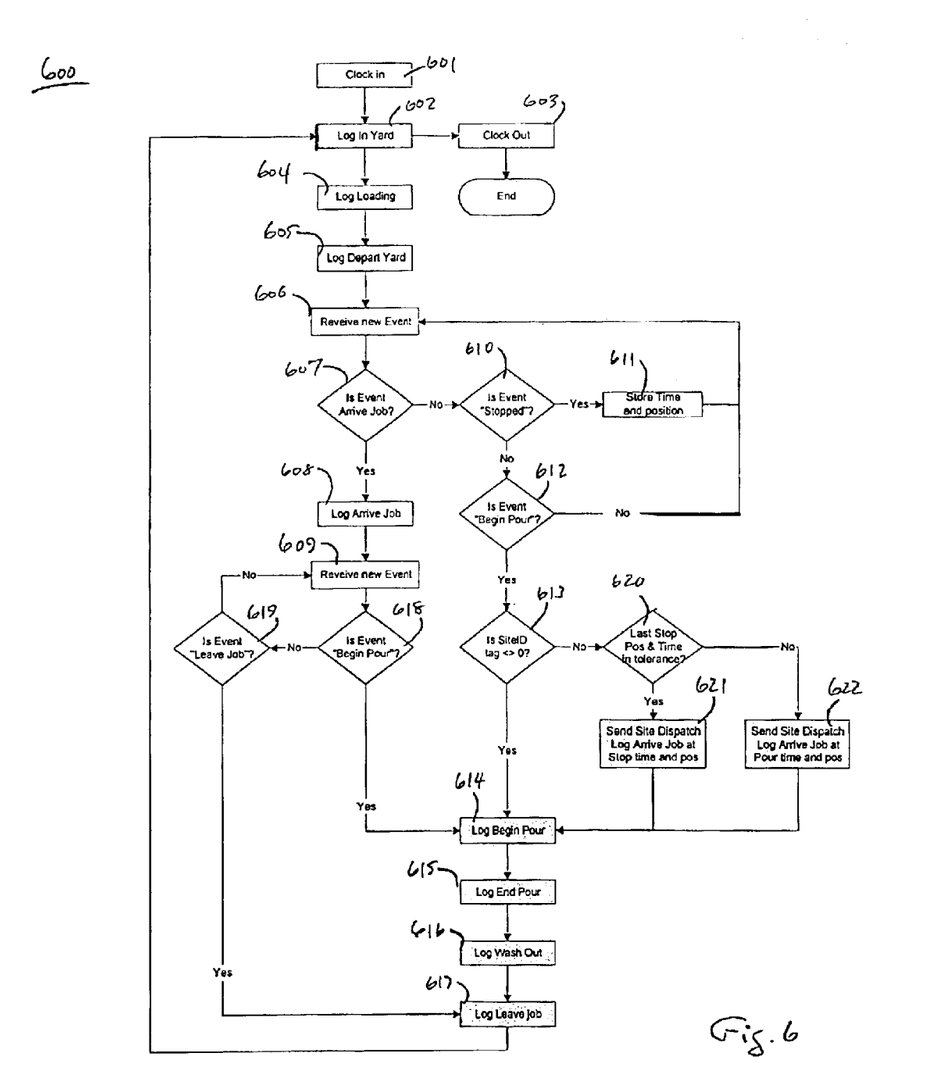
FIG. 6 is a flowchart of the steps in a method for inferring useful information from position related vehicular events incurred by an exemplary concrete delivery vehicle such as a cement mixer, according to one embodiment of the present invention.

With reference to FIG. 6, a process 600 applies an embodiment of the present invention to a particular exemplary business enterprise technology, that of delivery of concrete by a dispatched cement mixer vehicle to a job site (e.g., vehicle 101, job site 103; FIG. 1).

Process 600 begins with step 601, wherein the vehicle clocks into a yard where it is to be readied for a mission of delivering a concrete cement material mixture.

In step 602, the vehicle is logged in the yard. In step 603, the vehicle clocks out of the yard, upon execution of which, process 600 can be complete.

In step 604, loading of the vehicle commences and is logged. In step 605, the departure of the vehicle from the yard is logged.

In step 606, a new event is received, such as by a signal detected from an event monitor (e.g., event monitor 210; FIG. 2).

In step 607, it is determined whether the event comprises an arrival at a job site.

If it is determined that the vehicle has arrived at the job site, then in step 608, the arrival of the vehicle at the job site is logged. Upon logging arrival, in step 609 another new event is received.

If it is determined that the event does not comprise an arrival at the job site, then in step 610, it is determined whether the event comprises a vehicular stop.

If it is determined that the event comprises a stop, then in step 611 the time and position of that stop is stored, and process 600 loops back to step 606.

If it is determined that the event does not comprise a stop, then in step 612 it is determined whether the event comprises beginning a pour (e.g., dispensing of concrete).

If it is determined that the event does not comprise beginning a pour, then process 600 loops back to step 606.

If it is determined that the event comprises beginning a pour, then in step 613, it is determined whether an identifier corresponding to the site is viable (e.g., reasonable, such as greater than or less than zero," "a positive or negative number," etc.).

If it is determined that the identifier corresponding to the site is viable, then in step 614, beginning the pour is logged.

In step 615, the end of the pour is logged, upon completion of concrete material dispensing.

In step 616, wash out (e.g., removal of excess cement material) is logged, if an event monitor corresponding to the vehicle is configured to sense wash out. Thus, step 616 is optional.

In step 617, the departure of the vehicle from the job site is logged, and process 600 can be complete at this point, or can loop back to step 602.

Upon receiving another event (e.g., step 609), it is determined in step 618 whether the event comprises beginning a pour.

If it is determined that the event comprises beginning a pour, then process 600 proceeds to step 614 and logs the pour beginning.

If it is determined that the event does not comprise beginning a pour, then in step 619, it is determined whether the event comprises leaving the job site.

If it is determined that the event comprises leaving the job site, then process 600 proceeds to step 617, and logs departing from the job site.

If it is determined that the event does not comprise leaving the job site, then process 600 loops back to step 609.

If it is determined that an identifier corresponding to the site is not viable (e.g., that the job site location is not known in advance), then in step 620, it is determined whether the last stop position and time are in tolerance, as represented by a time window and a maximum deviation of position (e.g., the boundary R surrounding vicinity 110 proximate to job site 103; FIG. 1).

If it is determined that the last stop time and position are in tolerance, then in step 621, information is sent to dispatch (or stored for downloading there at a later time), which logs the arrival of the vehicle at the job site at that last stop time and position.

If it is determined that the last stop time and position are not in tolerance, then in step 622, information is sent to dispatch (or stored for downloading there at a later time), which logs the arrival of the vehicle at the job site at the time and position at which the pour commenced (e.g., step 614).

Upon execution of either step 621 or step 622, process 600 proceeds to step 614 and logs the beginning of dispensing cement concrete material.

In summary, one embodiment of the present invention performs a method for inferring useful information from position related vehicular events. In one embodiment, the operation of a mechanism or a similar event allows a vehicle equipped with a geographical position reckoning system to determine an arrival and/or departure of the vehicle from a job site, without knowing the location of the job site in advance. The vehicle can then report its arrival/departure from the job site to a dispatcher and/or to a dispatch application by various media, such as wireless transmission and/or downloading data from a data store upon the vehide's return to a dispatching site.

In one embodiment, a method of predicting the arrival/departure of a dispatched vehicle at/from a site using a series of implied rules. The rules are based on one or more events, e.g., specific activities corresponding to the commencement of work, using a series of implied rules. A system comprising a microprocessor or microcontroller device installed in or deployed by a dispatched vehicle monitors for the occurrence of an event or sequence of events that indicate in some positive sense that work is about to commence. Such trigger events can also be unique vehicular activities implicative of work commencement.

An embodiment of the present invention can be useful for vehicles operational in a dispatch environment and to fleet management. The examples used herein of material dispensing vehicles, such as cement mixers and aggregate are illustrative. Embodiments of the present invention are well suited to useful application with fleet or other management of vehicles in dispatch environments, as well. Examples of such vehicles include, but are not limited to, taxicabs, buses, ambulances, service vehicles, delivery vehicles, appliance delivery and/or service vehicles, technical support vehicles, hazardous material trucking, garbage and other waste disposal vehicles, recycling vehicles, road, yard, and rail maintenance vehicles, food delivery vehicles, personnel transport vans, shuttle vans and buses, and the like.

An embodiment of the present invention, a method for inferring useful information from position related vehicular events, is thus described. While the present invention has been described in particular embodiments, the present invention should not be construed as limited by such embodiments, but rather construed according to the following claims and their equivalents.

What is claimed is:

1. In a dispatch environment having a dispatch site, a vehicle, and a job site, a method for determining an arrival of said vehicle at said job site, comprising:
   a) receiving an indication that said vehicle engaged in a stop event;
   b) storing a time and a position corresponding to a location of said stop event;
   c) receiving an indication that said vehicle engaged in a trigger event;
   d) in response to said c), logging said time and said position;
   e) determining a window of value for said time wherein said window characterizes an earliest acceptable value and a latest acceptable value of said time; and
   f) determining a range of distance from said job site wherein said range characterizes a maximum acceptable distance from said job site.

2. The method as recited in claim 1 wherein a location of said job site is not known beforehand.

3. The method as recited in claim 1 further comprising:
   g) logging a departure from said dispatch site, wherein said g) is performed prior to said a).

4. The method as recited in claim 1 wherein said position comprises a geographic position.

5. The method as recited in claim 1 wherein said stop event, said trigger event, said time, and said position respectively comprise a first stop event, a first trigger event, a first time and a first position, further comprising:
   h) queuing said first time and said first position in a queue;
   i) receiving an indication that said vehicle engaged in a second stop event and an indication that said vehicle engaged in a second trigger event;
   j) determining that said queue is full; and
   k) replacing said first time and said first position in said queue respectively with said second time and said second position.

6. The method as recited in claim 1 further comprising:
   l) determining that said time and said position respectively correspond to a value within said window and said range; and
   m) logging said time and said position accordingly.

7. The method as recited in claim 1 further comprising:
   n) storing a time and a position corresponding to said c);
   o) determining that a value selected from the group consisting of said time and said position does not correspond to a value respectively within said window and said range; and
   p) logging said time and said position corresponding to said c) accordingly.

8. The method as recited in claim 1 further comprising:
   q) reporting said time and said position.

9. The method as recited in claim 8 wherein said q) comprises an action selected from the group consisting essentially of communicating said information in real time and downloading said information subsequently.

10. The method as recited in claim 9 wherein said communicating is performed wirelessly.

11. The method as recited in claim 9 wherein said q) comprises directing said position to a party selected from the group consisting essentially of a dispatch center and another vehicle.

12. The method as recited in claim 1 wherein said trigger event comprises an occurrence selected from the group consisting essentially of:
   an action taken by an operator of said vehicle;
   a movement of a component of said vehicle;
   an activity performed by said vehicle;
   a re-positioning of a structure of said vehicle;
   a change in the speed of operation of a part of said vehicle;
   a change in the direction of operation of a part of said vehicle; and
   an operation of a control mechanism of said vehicle.

13. On a vehicle operating within a dispatch environment, a system for inferring useful information from information related to a position of said vehicle, comprising:
   a bus for interconnecting a plurality of components;
   a processing device coupled to said bus for controlling said system;

a location determining component coupled to said bus for determining a position of said vehicle;

an event monitor coupled to said bus for receiving an input from an event monitoring device, wherein said event monitoring device generates said input upon the occurrence of an event undergone by said vehicle;

a clock coupled to said bus for determining time of occurrence of said event;

a data store coupled to said bus for storing said information; and a reporting functionality coupled to said bus for reporting said information within said discharge environment wherein, within said dispatch environment, a process is performed for determining an arrival of said vehicle at a job site, said process comprising:

a) receiving an indication that said vehicle engaged in a stop event;

b) storing a time and a position corresponding to a location of said stop event;

c) receiving an indication that said vehicle engaged in a trigger event;

d) in response to said c), logging said time and said position;

e) determining a window of value for said time wherein said window characterizes an earliest acceptable value and a latest acceptable value of said time; and f) determining a range of distance from said job site wherein said range characterizes a maximum acceptable distance from said job site.

14. The system as recited in claim 13 wherein said reporting functionality is selected from the group consisting essentially of a wireless transmitter and a data port.

15. The system as recited in claim 13 wherein said processing device is selected from the group consisting essentially of microprocessors and microcontrollers.

16. The system as recited in claim 13 wherein said location determining component comprises a Global Positioning System (GPS).

17. In a computer system operating in a dispatch environment having a dispatch site, a vehicle, and a job site, a computer usable medium having a computer readable program code embodied therein for causing said computer system to execute a method for determining an arrival of said vehicle at said job site, said method comprising:

a) receiving an indication that said vehicle engaged in a stop event;

b) storing a time and a geographic position corresponding to a location of said stop event;

c) receiving an indication that said vehicle engaged in a trigger event; and d) in response to said c), logging said time and said position;

wherein a location of said job site is not known beforehand;

e) determining a window of value for said time wherein said window characterizes an earliest acceptable value and a latest acceptable value of said time; and f) determining a range of distance from said job site wherein said range characterizes a maximum acceptable distance from said job site.

18. The computer usable medium as recited in claim 17 wherein said method further comprises:

g) logging a departure from said dispatch site, wherein said g) is performed prior to said a).

19. The computer usable medium as recited in claim 17 wherein said stop event, said trigger event, said time, and said position respectively comprise a first stop event, a first trigger event, a first time and a first position, and wherein said method further comprises:

h) queuing said first time and said first position in a queue;

i) receiving an indication that said vehicle engaged in a second stop event and an indication that said vehicle engaged in a second trigger event;

j) determining that said queue is full; and k) replacing said first time and said first position in said queue respectively with said second time and said second position.

20. The computer usable medium as recited in claim 17, wherein said method further comprises:

l) determining that said time and said position respectively correspond to a value within said window and said range; and m) logging said time and said position accordingly.

21. The computer usable medium as recited in claim 17, wherein said method further comprises:

n) storing a time and a position corresponding to said c);

o) determining that a value selected from the group consisting of said time and said position does not correspond to a value respectively within said window and said range; and p) logging said time and said position corresponding to said c) accordingly.

22. The computer usable medium as recited in claim 17, wherein said method further comprises:

q) reporting said time and said position.

23. In a dispatch environment having a dispatch site, a vehicle, and a job site, a method for determining an arrival of said vehicle at said job site, comprising:

a) receiving an indication that said vehicle engaged in a trigger event;

b) in response to said a), logging a time and a position corresponding to a location of said trigger event;

c) receiving an indication that said vehicle engaged in a stop event;

d) storing a time and a position corresponding to a location of said stop event; wherein c) and said d) are performed prior to said a);

e) determining a window of value for said time wherein said window characterizes an earliest acceptable value and a latest acceptable value of said time; and f) determining a range of distance from said job site wherein said range characterizes a maximum acceptable distance from said job site.

24. The method as recited in claim 23 further comprising:

g) logging a departure from said dispatch site, wherein said g) is performed prior to said c).

25. The method as recited in claim 23 wherein said slop event, said trigger event, said time, and said position respectively comprise a first stop event, a first trigger event, a first time and a first position, further comprising h) queuing said first time and said first position in a queue;

i) receiving an indication that said vehicle engaged in a second stop event and an indication that said vehicle engaged in a second trigger event;

j) determining that said queue is full; and k) replacing said first time and said first position in said queue respectively with said second time and said second position.

26. The method as recited in claim 23 further comprising:

l) determining that said time and said position respectively correspond to a value within said window and said range; and m) logging said time and said position accordingly.

27. The method as recited in claim 23 further comprising:

n) storing a time and a position corresponding to said a);

o) determining that a value selected from the group consisting of said time and said position does not correspond to a value respectively within said window and said range; and p) logging said time and said position corresponding to said c) accordingly.

28. The method as recited in claim 23 further comprising:

q) reporting said time and said position.

29. The method as recited in claim 28 wherein said q) comprises an action selected from the group consisting essentially of communicating said information in real time and downloading said information subsequently.

30. The method as recited in claim 29 wherein said communicating is performed wirelessly.

31. The method as recited in claim 29 wherein said q) comprises directing said position to a party selected from the group consisting essentially of a dispatch center and another vehicle.

32. The method as recited in claim 23 wherein a location of said job site is not known beforehand.

33. The method as recited in claim 23 wherein said position comprises a geographic position.

34. The method as recited in claim 23 wherein said trigger event comprises an occurrence selected from the group consisting essentially of:

an action taken by an operator of said vehicle;

a movement of a component of said vehicle;

an activity performed by said vehicle;

a re-positioning of a structure of said vehicle;

a change in the speed of operation of a part of said vehicle;

a change in the direction of operation of a part of said vehicle; and an operation of a control mechanism of said vehicle.

* * * * *